June 9, 1931.  G. MILLER  1,809,721
WING STRUCTURE FOR AIRCRAFT AND THE LIKE
Filed March 19, 1930
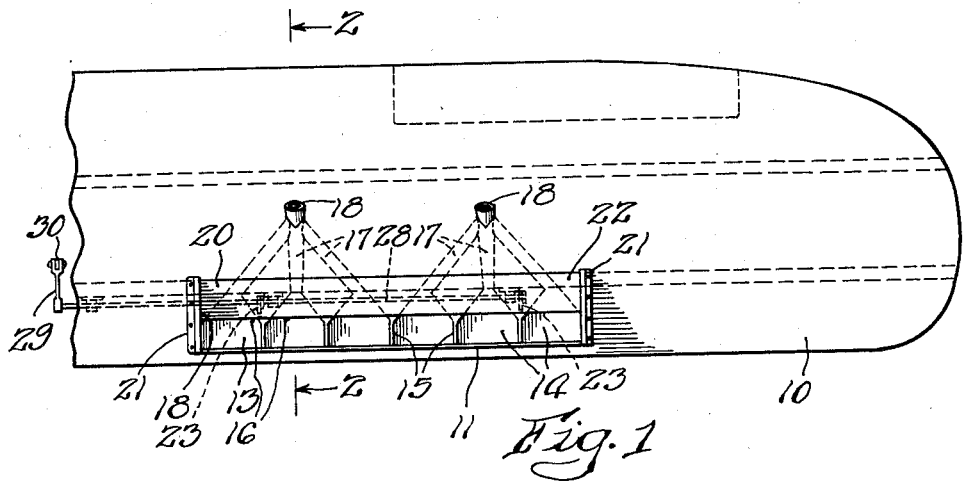
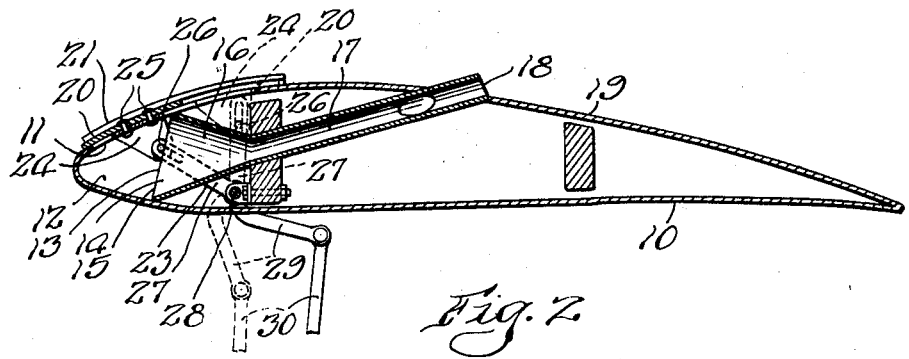
George Miller
INVENTOR
BY Victor J. Evans
HIS ATTORNEY.

Patented June 9, 1931

1,809,721

UNITED STATES PATENT OFFICE

GEORGE MILLER, OF CHICAGO, ILLINOIS

WING STRUCTURE FOR AIRCRAFT AND THE LIKE

Application filed March 19, 1930. Serial No. 437,196.

This invention relates to certain novel improvements in wing structures for aircrafts and the like, and has for its principal object the provision of an improved construction of this character which will be highly efficient in use and economical in manufacture.

Among the several objects of this invention is to provide a wing structure having associated therewith a simple arrangement for bringing a plane out of a tail spin and dives into a smooth gliding movement.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a plan view of a wing of an aircraft showing my improved invention associated therewith; and Fig. 2 is a sectional detail view of the same taken substantially on the line 2—2 of Fig. 1.

As stated, it is one of the many objects of this invention to bring an aircraft from what is known as a tail spin into a gliding movement, and to accomplish this and other objects of the invention, I construct a wing which has a novel arrangement associated therewith to produce an air resistance which will break the movement of a plane in a tail spin and cause the same to assume a gliding action. The wing structure in itself may be of any well known type, as it will be apparent from the description hereinafter that the invention may be embodied in any one of the well known wing structures of aircrafts now in use.

Referring more particularly to the drawing, the wing structure is indicated at 10. This wing structure at its forward side has formed therein an opening 11 which leads into a compartment 12. This compartment 12 is divided into a plurality of air chambers 14 by means of partitions 15. Each chamber 14 communicates with a funnel-shaped outlet mouth 16, which in turn has communication with an exhaust duct 17, and this exhaust duct 17 preferably terminates its outlet opening 18 at the top 19 of the wing 10.

A sliding closure in the form of a door 20 is provided to close the chamber 12, and the means for mounting this door for slidable movement may be of any approved structure, such as, for example, the means may include guiding strips 21 which slidably receive the ends 18 of the door. This door 22 is manually moved into and from door closing position by mechanism 23 operated from the pilot seat, and in the present instance this mechanism includes brackets 24 secured to the door as at 25, and these brackets have slidable and pivotal connection as at 26 with an arm 27 fixed to a shaft 28. This shaft 28 is rotated by means of an arm 29 having connection with an operating rod or cable 30 which leads to the pilot seat.

If desired, the structure just described may be incorporated in the wing 10 on opposite sides thereof to produce the desired result as herein set forth.

In operation, when the aircraft is moving in a horizontal plane or at an inclination with the horizon, the door 20 is in door closing position. Should the plane for some reason go into what is called a tail spin, the operator will manipulate the rod 30 to rock the shaft 28 in a direction to cause the arms 23 to act upon the brackets 24 and move the door 20 in an open position. This exposes the chamber 12 and permits the air to rush into the compartments 14. The exit of such air being resisted, creates an air resistance which will act upon the wings of the aircraft and cause the same to assume a horizontal or inclined position for movement in gliding action. As soon as the aircraft is righted, the door 20 is then closed.

From the description herein taken in connection with the accompanying drawings, it will be manifest that the structure embodying my invention to accomplish the desired result is of a simple nature and will be highly effective for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. Means for bringing an airplane out of a tail spin into substantially horizontal flight comprising the combination, with a wing structure having an opening in the upper wall adjacent the forward end thereof, of means defining a compartment in said wing into which air may enter through said opening, means providing a plurality of pockets in said compartment, conduits leading from said pockets angularly upward to the upper side of the wing rearwardly of said opening, a slidable door in normal flight closing said opening, and means for enabling the pilot to open said door when the plane falls into a tail spin whereby the air rushing through said pockets and inclined conduits will force the plane out of vertical and into horizontal flying position.

2. An aircraft wing structure including a body providing a compartment in the forward end of the wing, said wing having an opening therein leading into said compartment from the upper side thereof and adjacent the front end, means defining a plurality of pockets in said compartment, conduits leading angularly upward from said pockets and opening exteriorly on the upper side of the wing rearwardly of said opening, a slidable door over said opening, and means enabling the pilot to open and close said door for the purposes set forth.

In testimony whereof I affix my signature.

GEORGE MILLER.